United States Patent Office 3,686,229
Patented Aug. 22, 1972

3,686,229
PRODUCTION OF PHTHALIC ANHYDRIDE
Guenter Poehler, Hubert Suter, Friedrich Wirth, and Johann Heinrich Walter, Ludwigshafen, Germany, assignors to Badische Anilin- & Soda-Fabrik Aktiengesellschaft, Ludwigshafen (Rhine), Germany
No Drawing. Filed Dec. 2, 1968, Ser. No. 780,607
Claims priority, application Germany, Dec. 1, 1967, P 16 43 703.9
Int. Cl. C07c 63/02
U.S. Cl. 260—346.4                                   4 Claims

ABSTRACT OF THE DISCLOSURE

Continuous production of pure phthalic anhydride by air oxidation of o-xylene with certain fixed-bed supported catalysts containing vanadium pentoxide and titanium dioxide in a specific tubular reactor and by sublimation, thermal treatment and continuous distillation under specific conditions.

---

The present invention relates to a new continuous process for the production of phthalic anhydride on a commercial scale.

It is generally known that phthalic anhydride can be prepared by oxidation of aromatic hydrocarbons, particularly of o-xylene, with air in tubular reactors in the presence of supported catalysts containing vanadium pentoxide. The good success of this method in commercial operation as regards high yields, trouble-free continuous operation and consistent quality of the phthalic anhydride depends however on many parameters, some of which are independent of each other and some of which are dependent on each other, and even interdependence of process steps which are separated in time has been observed.

Owing to the many parameters and the interactions between them, some of which are unknown, the problem of optimizing such a process cannot be solved by systematic deduction.

It is the object of this invention to improve the process for the production of phthalic anhydride according to the abovementioned general methods to such an extent that it gives invariably high yields of consistent quality in continuous commercial operation, that it is easy to control and that it is little susceptible to disturbances.

We have found a process for the continuous production of phthalic anhydride by the oxidation of o-xylene with air in a tubular reactor using a supported catalyst containing vanadium pentoxide followed by working up the reaction gas by sublimation of the phthalic anhydride in a separator and by producing pure phthalic anhydride by thermal treatment followed by continuous distillation, wherein (a) A mixture of air and o-xylene heated to 150° to 200° C. is supplied to a reactor whose tubes are filled with a catalyst which consists of inert spherical material which is non-porous or less an internal surface area of not more than 3 m.$^2$/g. and to which from 1 to 12% by weight (with reference to the amount of carrier material) of an active catalyst composition has been applied which in addition to anatase contains from 1 to 40%, preferably from 1 to 25%, by weight (with reference to the amount of active composition) of vanadium pentoxide, the total amount of vanadium pentoxide in the supported catalyst not exceeding 3% by weight;

(b) A maximum temperature of from 420° to 490° C., preferably from 440° to 470° C. is maintained in the interior of the tubes, heat exchange being effected by means of a salt bath kept at from 375 to 420° C. which is supplied to the reactor at one end through a ring channel from all directions and withdrawn at the other end through another ring channel;

(c) The reaction gas leaving the reactor is precooled to 160° to 180° C. and supplied to a tubular separator whose outer wall is kept at about the melting temperature of phthalic anhydride also during the cooling phase of the separation cycle; and (d) The crude phthalic anhydride is thermally treated and continually distilled in a falling film evaporator distillation plant to purify it.

In order to carry out oxidation of o-xylene with air in a tubular reactor to form phthalic anhydride on a large scale, air is preheated to 140° to 200° C. and the aromatic feedstock is sprayed into the hot air. From 4000 to 10,000 liters of air per hour is used and about 3 to 60 g., preferably about 40 g., of o-xylene is supplied to each m.$^3$ (STP) of air. The mixture then passes into the reactor. This is provided with a catalyst consisting of spheres of inert nonporous material coated with a catalytic composition consisting of anatase and 1 to 40%, advantageously 1 to 25%, particularly 1 to 15%, by weight of vanadium pentoxide in a thickness of 0.01 to 2 mm., particularly 0.01 to 1.5 mm., advantageously 0.01 to 1 mm. in such a way that the finished catalyst preferably contains from 0.1 to 2% by weight of vanadium pentoxide. The spheres advantageously have a diameter of 4 to 15 mm., particularly 6 to 12 mm.

A reactor which is suitable for the process may consist for example of 6000 to 11,000 tubes having a diameter of from 25 to 40 mm. At each end of the reactor an annular channel is provided for the supply and withdrawal of the salt bath functioning as coolant. The annular channel is connected with the interior of the reactor through openings. The whole volume of the reactor is filled up with tubes. A salt bath which is kept at from 375° to 420° C. in the reactor is advantageously used as the coolant. The melt is passed countercurrent to the reaction gases. With the temperature of the melt within the stated limits, the maximum temperature in the catalyst chamber (which occurs in the first third and is known as the hot spot) is held at 420° to 490° C., particularly from 440° to 470° C.

The reaction gas leaving the reactor passes into a heat exchanger in which it advantageously gives up its heat to the air to be heated up. It leaves the preheater at a temperature of from 160° to 180° C. and then passes into the separator.

In accordance with the invention, the casing of the separator is heated during the entire operation, for example with steam. The interior of the separator contains a tube system through which flows a coolant, particularly cold oil. This is where phthalic anhydride is separated. The vapor passes thence into a tower in which it is moistened with water and freed from maleic acid. After a certain period the coolant in the separator is shut off and a heating medium, for example hot oil, is passed through the tube system. The crude phthalic anhydride thus liquefies and flows down. It is treated continuously in a stirred vessel cascade consisting of at least two stages at temperatures of from 190° to 280° C., at least one stage being kept at above 230° C. Distillation of the product thus pretreated which follows is advantageously carried out in a plurality of columns at 160° to 240° C. and at subatmospheric pressure of from about 20 to 200 mm. The bottoms of the column is connected with falling film evaporators. The constituents of lowest boiling point are driven off in the first column while pure phthalic anhydride distils off in the second column and constituents of higher boiling point are withdrawn at the bottom of the second column. It is advantageous to evaporate less than 60%, preferably 5 to 50%, particularly 15 to 50%, by weight of the product supplied to the evaporator.

The process according to this invention results in a throughput of reaction mixture which is three to five times higher than in the prior art method and the starting material is substantially converted into phthalic anhydride and considerably less carbon of the starting material is burnt than in the prior art methods. Accordingly less heat has to be removed, which offers a number of advantages.

The invention is illustrated by the following example.

EXAMPLE 45,000 m.³ of air is heated to 140° C. 1.8 metric tons of o-xylene (previously also preheated to 140° C.) is sprayed into the preheated air. This mixture is supplied per hour to the upper portion of a reactor which contains 10,000 tubes having a diameter of 25 mm. and a length of 3.15 meters. The tubes are surrounded by a bath of potassium nitrate. The reactor has an annular channel at the upper end and another at the lower end for the salt melt to enter and leave. The melt flows countercurrent to the substances being oxidized, leaves the reactor at the top of the same, is cooled and returned to the lower end.

The temperature of the melt in the reactor is kept at 390° C.

The tubes are filled with a catalyst which consists of steatite spheres having a diameter of 6 mm. which have been heated to 300° C. and coated with 4% of a composition consisting of 6% of vanadium pentoxide and 94% of anatase so that the finished catalyst contains 0.24% by weight of vanadium pentoxide.

The maximum temperature (460° C.) in the catalyst zone is set up in the tubes 1 meter from the point of entry of the starting material. The reaction product is precooled in a cooler to 180° C. and then passes into a separator whose casing both during the separation and melting off is heated with steam to the melting temperature of phthalic anhydride. The tube system in the separator has a heat exchange area of 3500 m.². Three such separators are used, one of which serves to separate the phthalic anhydride while the melting off process is being carried out in the other two.

Phthalic anhydride at a temperature of about 200° C. which has been melted off then passes into two successive stirred vessels, each having a capacity of 20 m.³, where it remains for twenty hours at a temperature of 250° C. Thence it is supplied to a column having twenty-five trays. The pressure is 150 mm. The bottoms of the column is supplied to a falling film evaporator in which it is heated up and returned to the column so that a bottoms temperature of 225° C. is set up in the column; a first runnings, amounting to 0.5% of the charge, is withdrawn from the top of the column.

The bottoms then passes into a second column. The bottoms from this column is similarly heated up in a falling film evaporator and returned to the column so that the bottoms in the column has a temperature of 235° C.

Pure phthalic anhydride is taken off at the top of the column whereas a high boiling residue consisting of high boiling benzal carboxylic acids is withdrawn in an amount of 0.2% from the pipe from the bottoms to the falling film evaporator.

We claim:

1. A process for the continuous production of phthalic anhydride by the oxidation of o-xylene with air in a tubular reactor using a supported catalyst containing vanadium pentoxide followed by working up the reaction gas by sublimation of the phthalic anhydride in a separator and by producing pure phthalic anhydride by thermal treatment followed by continuous distillation, wherein (a) a mixture of air and o-xylene heated to 140° to 200° C. is supplied to a reactor whose tubes are filled with a catalyst which consists of inert spherical material which is non-porous or has an internal surface area of not more than 3 m.²/g. and to which from 1 to 12% by weight (with reference to the amount of carrier material) of an active catalyst composition has been applied which in addition to anatase contains from 1 to 40% by weight (with reference to the amount of active composition) of vanadium pentoxide, the total amount of vanadium pentoxide in the supported catalyst not exceeding 3% by weight;

(b) a maximum temperature of from 420° to 490° C. is maintained in the interior of the tubes, heat exchange being effected by means of a salt bath kept at from 375° to 420° C. which is supplied to the reactor at one end through an annular channel from all directions and withdrawn at the other end through another annular channel;

(c) the reaction gas leaving the reactor is precooled to 160° to 180° C. and supplied to a tubular separator whose outer wall is kept at about the melting temperature of phthalic anhydride during the heating and cooling phase of the separation cycle; and (d) the crude phthalic anhydride is thermally treated and continually distilled in a falling film evaporator distillation plant to purity it.

2. The process as claimed in claim 1 wherein the catalyst composition contains from 1 to 25% by weight of vanadium pentoxide.

3. A process as claimed in claim 1 wherein the maximum temperature in the interior of the tubes is from 440° to 470° C.

4. A process as claimed in claim 1, wherein the spheres have a diameter of 4 to 15 mm.

References Cited

UNITED STATES PATENTS

| | | | |
|---|---|---|---|
| 3,420,750 | 1/1969 | Schafer et al. | 260—346.7 |
| 3,464,930 | 9/1969 | Friedrichsen et al. | 252—469 |
| 3,306,915 | 2/1967 | Urbaski | 260—346.4 |
| 3,129,230 | 4/1964 | Hughes | 260—346.4 |
| 3,232,955 | 2/1966 | Nonnenmacher | 260—346.4 |
| 3,507,886 | 4/1970 | Suter | 260—346.7 |

OTHER REFERENCES

Landau et al.: Chemistry and Industry, July 29, 1961, pp. 1143–1146.

ALEX MAZEL, Primary Examiner

B. I. DENTZ, Assistant Examiner

PO-1050
(5/69)

UNITED STATES PATENT OFFICE
CERTIFICATE OF CORRECTION

Patent No. 3,686,229                     Dated August 22, 1972

Inventor(s) Guenter Poehler, Hubert Suter, Friedrich Wirth, et al

It is certified that error appears in the above-identified patent and that said Letters Patent are hereby corrected as shown below:

Column 2, line 16, " 3 to 60 g., " should read,
-- 30 to 60 g., ---

Signed and sealed this 9th day of January 1973.

(SEAL)
Attest:

EDWARD M. FLETCHER, JR.                    ROBERT GOTTSCHALK
Attesting Officer                          Commissioner of Patents